2,868,752

STABLE EMULSION CONTAINING AN ACRYLATE, ACRYLIC ACID, AND AN ACRYLONITRILE

Charles Frazier, Yonkers, N. Y., and James H. Fortune, Springdale, Conn., assignors to American Cyanamid Company, New York, N. Y., a corporation of Maine No Drawing. Application September 23, 1955
Serial No. 536,303

9 Claims. (Cl. 260—29.6)

This invention relates to synthetic thermoplastic latex compositions comprising the reaction product of at least 3 different polymerizable monoethylenic monomers containing a vinyl of $CH_2=C<$ group. More particularly, this invention relates to a freeze-thaw and mechanically stable copolymer latex composition which utilizes a specific emulsifiers in combination with an α-unsaturated monocarboxylic, i. e., acrylic acid or substituted acrylic acids, as one of the monomers; acrylonitrile or methacrylonitrile as a second; and acrylate esters as the third monomer.

Copolymers made from monoethylenic monomers containing a vinyl $CH_2=C<$ group in aqueous emulsion have been found very useful as surface coatings, such as paints, paper coatings, textiles, and adhesives, among other uses. The problem heretofore has been in finding suitable emulsifying agents to polymerize these compounds into a copolymer of sufficient stability, suitable homogeneity and sufficiently high solids content. The advantages of making the compositions which resist breakdown and/or coagulation due to alternate freezing and thawing of the aqueous latex system and also which are capable of withstanding the mechanical stress resulting from processing and handling operations are readily apparent. The processing, handling, distribution, and storage of paints and other coating compositions incorporating these emulsions requires that they withstand, without coagulating, severe mechanical agitation and extreme temperature variations, ranging from temperatures well below the freezing point of water to those well in excess of 100° F. Under these severe conditions, the entire composition may freeze irreversibly into a mass or coagulate to an extent as would destroy their usefulness. Some emulsifiers, such as soaps, often contaminate and discolor the polymer, as some of the soap is tenaciously absorbed on the surface of the dispersed phase, so that the resulting product is objectionably colored. Also, apart from not providing good freeze-thaw stability, many proposed agents must be used in a relatively high concentration to be effective, which both accentuates any contaminative properties and increases manufacturing costs. In many instances it has been found that emulsion coating compositions, including those which have freeze-thaw stability, will not recoat or have poor recoat properties. A good recoat property permits the application of successive layers of the emulsion with adhesion such that the successive layers integrate into a unitary layer or coating. With some freeze-thaw emulsions, recoating properties have been so poor that successive coatings do not adhere well under ordinary circumstances, and separate into layers, resulting in severely curtailing the use of these emulsified polymers. It is therefore desirable that these latex emulsion compositions not only be capable of withstanding such severe conditions without losing any of their original properties when agitated or upon thawing from the frozen state but also have the property of recoating as well.

It is an object of this invention to provide an improved stable latex emulsion copolymer composition. It is a further object to provide an emulsion copolymer requiring small amounts of emulsifying material which is substantially free from objectionable impurities and low in residual unreacted monomer. More specifically, it is the object of the present invention to provide a freeze-thaw and mechanically stable emulsion copolymer composition having excellent recoat characteristics. Various other objects and advantages of our invention will be apparent as the present description proceeds.

In the present invention certain distinct advantages are obtained by employing from about 1% to about 10%, preferably from 2% to 7%, by weight based on the total weight of the monomer content of an emulsifier selected from the class consisting of alkali metal salts of a sulfated fatty acid having from 10 to 16 carbon atoms in the copolymerization reaction of an α-unsaturated monocarboxylic acid monomer, and two different monomers containing the polymerizable monoethylenically unsaturated $CH_2=C<$ group, i. e., (1) acrylonitrile or methacrylonitrile and (2) esters of acrylic acid. Other objects will become apparent from the following description.

Although the provision of compositions by emulsion polymerization methods are known and freeze-thaw stable latex compositions are also bnown, difficulty is frequently experienced in attempts to use a specific emulsifier, which has been found useful in making a particular polymer to polymerize different monomers or proportions to produce emulsions having a sufficiently high solids content and low coagulation. As an illustration, the emulsion polymerization of the monomers acrylonitrile and ethyl acrylate to make a freeze-thaw stable composition of sufficiently high solids content has been particularly difficult. According to the teaching of this invention, the emulsion copolymerization of various combinations of tripolymers in various proportions using the emulsifier herein set forth, is possible. The latex emulsions produced according to the invention have a relatively high solids content, are substantially free of coagulation and unreacted monomer, and have excellent stability. Of particular significance is the excellent recoat properties of compositions containing these emulsions.

Briefly, the invention comprises the emulsion polymerization of a copolymer having as essential constituents (1) an emulsifier of an alkali metal salt of a sulfate of a fatty acid having 10–16 carbon atoms, (2) a monomer selected from the group of lower α-unsaturated monocarboxylic acids or lower acrylic acids, (3) acrylonitrile or methacrylonitrile, and (4) alkyl esters of acrylic acid and methacrylic acid wherein the alkyl radical has from 1 to 4 carbon atoms.

Of particular suitability because of high conversion and low coagulation is the emulsifier sodium lauryl sulfate. This emulsifier has anionic properties and is available commercially, as for example, under the trade name Duponol "C."

In order to obtain consistently good emulsions of high yield and low coagulant, low residual monomers, good recoat characteristics and excellent stability, it is necessary that one of the copolymerized monomers be one of the α-unsaturated monocarboxylic acids. The α-unsaturated monocarboxylic acids, or lower acrylic acids, contemplated are those falling within the general formula

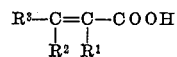

wherein $R^1$ and $R^2$ are substituents selected from the class consisting of hydrogen, alkyl radicals of 1 and 2 carbon atoms, halogen, and amino groups and $R^3$ is selected from the class of hydrogen, alkyl radicals having 1 and 2 carbon atoms, halogen, an amino group, and a halogen, hydroxy and amino alkyl of 1 and 2 carbon atoms, and the total number of halogen, hydroxy and amino substituents is no greater than 1.

Among such acids are acrylic acid, methacrylic acid, ethacrylic acid, crotonic acid, isocrotonic acid, and the halogen, amine and hydroxy substituted derivatives of these acids. Preferred characteristics have been obtained in emulsions utilizing methacrylic acid. The range of acrylic acid monomer may vary from 0.5% to 10% of the total weight of monomers reacted, preferably from 1% to 5%.

The second monomer employed is acrylonitrile or methacrylonitrile.

Illustrative of the acrylic acid esters, or third monomer, which is employed, are such as methyl acrylate, ethyl acrylate, propyl acrylate, butyl acrylate, methyl methacrylate, ethyl methacrylate, propyl methacrylate, butyl methacrylate and the like.

In order to achieve the advantages of a superior freeze-thaw and mechanically stable latex of high conversion, low coagulation and possessing the property of good fusion between successive coatings or layers, it is necessary that the three monomers be polymerized with an emulsifier of an alkali metal salt of a sulfate of a fatty acid having from 10 to 16 carbon atoms. A combination which has given an emulsion with excellent characteristics is the tripolymer of ethyl acrylate, acrylonitrile and methacrylic acid with sodium lauryl sulfate emulsifier.

The exact mechanism which provides the superior stability, both freeze-thaw and mechanical, to the composition of the instant invention is not known; however, the presence of the three monomers selected from the classes above described and of the alkali metal sulfate salt emulsifier is necessary to obtain the desired properties. The anionic sodium lauryl sulfate provides improved mechanical stability and recoating characteristics among other advantages. Mechanical stability is not always parallel to freeze-thaw stability. Thus in various instances where emulsifiers provide superior freeze-thaw stability, the mechanical stability is very poor. Also, in many instances wherein the freeze-thaw stability and mechanical stability are both good, the conversion may be so low and the particle size such that the composition is unsuitable for most applications In practicing the instant invention, the emulsifier may be dissolved in the monomer phase. Alternately, the emulsifier may be dissolved in the water phase or any part thereof in the monomer phase and the remainder in the aqueous phase. In order to provide practically complete conversion and thereby substantially reduce subsequent necessity of steam distillation for removal of unreacted monomers, it is preferred to begin addition of the catalyst solution into the aqueous phase at such a rate that the addition thereof extends from a time prior to the beginning of the addition of the monomer phase until a time after all of the monomer has been added.

To ascertain the freeze-thaw stability and mechanical stability of the resins, the following procedures have been employed:

In testing for freeze-thaw properties, a portion of the emulsion is placed in a one-ounce glass bottle and is subjected to repeated freeze-thaw cycles of freezing for 16 to 18 hours at −13° C. to −16° C. and subsequently thawing at room temperature for 8 to 10 hours. Where the emulsion has not coagulated after about 10 cycles under these conditions, the emulsion is considered resistant to irreversibility from freezing and is then generally subjected to a further freezing, again at −13° C. to −16° C. for one week and again thawed at room temperature. If the sample passes this test, it is then generally subjected to a further cycle of freezing at −13° C. to −16° C. for two weeks and thawing at room temperature. Where results of freeze-thaw stability are expressed as greater than a given number of cycles, this includes the one-week and the two-week freeze-thaw cycle. Generally when a composition has withstood several freeze-thaw cycles without loss of desired properties, it is generally unimpaired by subsequent cycles.

The mechanical stability is tested according to the following procedure:

Twenty-five grams of 6 mm. glass beads are placed in a one-ounce screw cap bottle and the emulsion to be tested is added until it reaches the top level of the beads. This bottle is then tumbled on rollers until the first coagulate occurs in either the liquid or on the bottle cap. The time elapsing until the first appearance of coagulate is taken as a measure of the mechanical stability of the emulsion being tested. An emulsion failing, i. e., coagulating in less than 24 hours is given the rating, "poor"; an emulsion failing between 24 and 100 hours is given the rating, "air"; an emulsion failing between 100 and 350 hours is given the rating "good"; and an emulsion passing 500 hours without exhibiting coagulation is given the rating, "excellent."

In order that the present invention may be fully understood, the following examples are set forth for the purposes of illustration only, and any specific enumeration in detail should not be interpreted as a limitation, except as expressed in the appended claims. Unless otherwise stated, the monomers are usually employed at concentration ranging between 40% and 55%.

EXAMPLE 1

Into a suitable reaction vessel equipped with reflux condenser, mechanical stirrer, inlet and outlet tubes, and thermometer, 4.5 parts of sodium lauryl sulfate is added to 100 parts of ion exchanged water which has 0.75 part of sodium bicarbonate dissolved in it, and the solution is heated to 90° C. to 95° C. with agitation. When the solution reaches this temperature, a solution of 0.5 part $(NH_4)_2S_2O_8$ in 25 parts of ion exchanged water is added in increments. Then the addition in increments of a monomer phase of 70 parts of ethyl acrylate monomer, inhibitor free; 29 parts of acrylonitrile and 1 part of methacrylic acid distilled, is started. The addition rate of the monomers, providing a concentration of about 45%, is adjusted so that about one-fifth of the catalyst solution remains after all of monomer phase has been added to the reaction vessel. This one-fifth portion of catalyst solution is added during the final one-half hour of heating of this emulsion. This reaction is carried out under conditions of mild reflux and at temperatures varying between 85° C. to 95° C. At the end of the heating period, live steam is introduced into the emulsion to remove unreacted monomers. The total reaction time is approximately 2 to 3 hours with approximately up to one hour additionally required to remove residual monomers by passing live steam through the emulsion. The solids of the emulsion at the end of the polymerization is approximately 45% ±1% and the solids after steam stripping the residual monomer is held as nearly as possible to this figure. Any coagulum formed during polymerization and/or steam stripping is filtered out before testing and the pH adjusted to 9.5 with 28% $NH_4OH$.

EXAMPLE 2

The procedure of Example 1 is repeated with the exception that 63 parts of ethyl acrylate, 35 parts of acrylonitrile and 2 parts of methacrylic acid are employed and the $(NH_4)_2S_2O_8$ is increased to 0.7 part. The latex produced by this formulation also has low coagulation and excellent yield, freeze-thaw reversibility, and recoat adhesion. The results are found in Table 1.

EXAMPLE 3

The same formulation and procedure as used for Example 1 is employed except that Aerosol MA (dihexyl ester of sodium sulfosuccinic acid) is substituted for Duponol "C." The solids of the steamed and concentrated batch is 43.4% and the pH is 6.7. Coagulum formed during polymerization and/or steaming is filtered out before testing. The pH of the emulsion is adjusted to 9.5 with 28% NH$_4$OH and tested for freeze-thaw and mechanical stability. The particle size of this emulsion is 0.08 to 0.30 micron with the majority of the particles in the range 0.18 to 0.22 micron. The coagulation, as may be seen from the results in Table 1, is comparatively excessive. Recoat properties are inferior. Successive coatings of compositions employing this emulsion adhered poorly, separating into fairly distinct layers or films.

in the range 0.10 to 0.15 micron. The results appear in Table 1.

EXAMPLE 7

Same formulation and procedure as used for Example 1, except that Nacconol NRSF, an alkyl aryl sulfonate, is substituted for Duponol "C." The solids of the steamed and concentrated batch is 47% and the pH is 5.9. Any coagulum formed during polymerization and/or steaming is filtered out and the pH adjusted to 9.6 with 28% NH$_4$OH before testing for freeze-thaw and mechanical stability. The results appear in Table 1.

Table 1

| Example No. | Copolymer Composition | | | Emulsifier System | | | | | Percent Solids | | Percent Conversion | Percent Coag. | Solids after Concentrating | pH | | Freeze Thaw Stab., Cycles | Mech. Stab., Hrs. on Bead Test |
|---|---|---|---|---|---|---|---|---|---|---|---|---|---|---|---|---|---|
| | Percent EA | Percent AN | Percent MAA | Percent Dup. "C" | Percent MA | Percent Dres. 731 | Percent Sodium Oleate | Percent Nacconol NRSF | Theory | Actual | | | | As Made | Adj. w. NH$_4$OH | | |
| 1 | 70 | 29 | 1 | 4.5 | | | | | 46.5 | 46.4 | 99.9 | 0.22 | 44.2 | 5.8 | 9.5 | 14 | >500 |
| 2 | 63 | 35 | 2 | 3.0 | | | | | 46.5 | 42.7 | 91.5 | 1.2 | 41.4 | 6.3 | 9.5 | 14 | >500 |
| 3 | 70 | 29 | 1 | | 4.5 | | | | 46.5 | 46.3 | 99.9 | 5.5 | 43.4 | 6.7 | 9.5 | 14 | >500 |
| 4 | 70 | 29 | 1 | | | 4.5 | | | 46.5 | | ¹93.1 | 10.0 | 37.0 | 5.8 | 9.5 | 12 | >500 |
| 5 | 70 | 29 | 1 | | | | 4.5 | | 46.5 | 41.1 | ²90.0 | 22.22 | 42.3 | 6.2 | 9.5 | 14 | >500 |
| 6 | 71 | 29 | | | | | 4.5 | | 46.5 | 42.3 | 91.0 | 15.60 | 43.0 | 6.0 | 9.5 | 14 | >500 |
| 7 | 70 | 29 | 1 | | | | | 4.5 | 46.5 | 45.1 | 97.5 | 2.22 | 47.1 | 5.9 | 9.6 | 14 | >500 |

¹ Includes 10% coagulation.
² Based on solids left in the emulsion.
Abbreviations:
Monomers: EA=ethyl acrylate; AN=acrylonitrile; MAA=methacrylic acid.
Emulsifiers: Dup. "C"=Duponol C; MA=Aerosol MA; Dres. 731 = Dresinate 731.

EXAMPLE 4

Same formulation and procedure as used for Example 1, except that Dresinate 731, sodium salt of disproportionated rosin acids, is substituted for Duponol "C." The solids of the steamed and concentrated batch is 37.0% and the pH is 5.8. Coagulum formed during polymerization and/or steaming is filtered out before testing and the pH adjusted to 9.5 with 28% NaOH. A portion of the filtered emulsion tested for freeze-thaw and mechanical stability gives acceptable results but the excessive coagulant renders this formulation impractical. The particle size of this emulsion was 0.10 micron for the single particles. This emulsion also contained agglomerated particles about 0.20 to 0.60 of a micron. Data for Example 4 appears in Table 1.

EXAMPLE 5

Same formulation and procedure as used for Example 1, except that a soap, sodium oleate U. S. P., is substituted for the Duponol "C." The solids of the steamed and concentrated batch was 42.3% and the pH was 6.2. Coagulum formed during polymerization and/or steaming is filtered out before testing and the pH is adjusted to 9.5 and a portion tested for freeze-thaw and mechanical stability according to the procedure hereinbefore described. The particle size range of this emulsion was 0.10 to 0.22 micron with occasional 1 to 5 micron particles. The majority of the particles were in the range 0.12 to 0.16. A portion of the filtered emulsion tested for freeze-thaw and mechanical stability gave acceptable results but the excessive coagulation renders this formulation impractical also (see Table 1).

EXAMPLE 6

Same formulation and procedure as used for Example 1, except that a soap, sodium oleate U. S. P., is substituted for the Duponol "C" and the methacrylic acid is omitted. The solids of the steamed batch is 43.0% and the pH is 6.0. Any coagulum formed during polymerization and/or steaming is filtered out and the pH adjusted to 9.5 before testing. This formulation also produces excessive coagulation. The particle size range of this emulsion is 0.05 to 0.30 micron with the majority falling In the reaction products of the instant invention, the weight of water to monomer phase is not critical and may be varied from 1:1 to 10:1, respectively, depending on the concentration of solids desired in the final emulsion. In many surface applications, it is desirable that successive coatings of latex of low concentration rather than a single comparatively thick coating be applied. The thickness of a single coating of course it limited by the spreadability of higher solids compositions.

Illustrative of monomer combinations that may be employed are ethyl acrylate-acrylonitrile-methacrylic acid, methyl methacrylate-acrylonitrile-acrylic acid, ethyl methacrylate-acrylonitrile-acrylic acid, butyl acrylate-acrylonitrile-acrylic acid, butyl methacrylate-acrylonitrile-methacrylic acid, butyl acrylate-acrylonitrile-methacrylic acid, and the like. The ratios of monomers used is not critical, except that the range of acrylic acid, methacrylic acid, or other acrylic acid hydrophilic monomer of the general formula should be employed in amounts between 0.5% to 10% and preferably between 1% to 5% by weight based on the total weight of this monomer that is employed.

The ratios of the acrylonitrile or methacrylonitrile monomer may vary from about 5% to about 55%. The acrylate ester may vary in amounts from about 35% to about 95% by weight based on the total weight of the monomers. In most cases the monomer ratios depend on the end use of the product being made and as each application often requires that it contain certain specific properties, the monomer ratios are combined to give a product with the desired physical and chemical properties.

It will be apparent that the instant invention provides a freeze-thaw reversible and mechanically stable emulsion with the formation of a minimum amount of coagulum and excellent recoat characteristics.

In practicing the invention, various plasticizers, pigments, fillers, and the like may be employed without departing from the scope of the invention.

In addition to ammonium persulfate, other catalysts such as potassium persulfate, hydrogen peroxide, benzoyl peroxide, and the like may be employed. Preferably, ammonium persulfate is used as the catalyst.

It is essential to the stability of the emulsions of the instant invention that the composition have a pH greater than 7 and preferably a pH in the range of 9 to 11. Various alkaline materials may be employed to adjust the pH, such as ammonia, sodium hydroxide, amines, and the like; but preferably concentrated ammonia is used.

It will be apparent that various modifications are possible within the scope of the instant invention, and any enumeration of specific details is not intended to limit the invention except as defined in the appended claims.

We claim:

1. A thermoplastic freeze-thaw and mechanically stable tripolymer emulsion composition having a pH greater than 7 and preferably a pH in the range of 9 to 11. Various alkaline materials may be employed to adjust the pH, such as ammonia, sodium hydroxide, amines, and the like; but preferably concentrated ammonia is used.

2. A thermoplastic freeze-thaw and mechanically stable tripolymer emulsion composition having a pH greater than 7 comprising the reaction product of (1) from about 1% to 10% based on the total weight of the monomer content of an alkali metal salt of a sulfated fatty acid emulsifier wherein said acid contains from 10 to 16 carbon atoms, containing as sole monomers (2) an α-unsaturated polymerizable monocarboxylic acid monomer having the general formula:

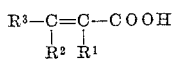

wherein $R^1$ and $R^2$ are substituents selected from the group consisting of hydrogen, alkyl radicals of 1 and 2 carbon atoms, halogen, and amino groups and $R^3$ is selected from the group consisting of hydrogen, alkyl radicals having 1 and 2 carbon atoms, halogen, an amino group, hydroxy and amino alkyl of 1 and 2 carbon atoms, and the total number of halogen, hydroxy and amino substituents is no greater than 1, in amounts of from about 0.5% to 10% by weight based on the total weight of the monomer content, (3) a monomer selected from the group consisting of acrylonitrile and methacrylonitrile an amount of from about 5% to 55% by weight, (4) an ester selected from the group consisting of alkyl acrylates and alkyl methacrylates wherein the alkyl group has from 1 to 4 carbon atoms, in amounts of from about 35% to about 94.5% by weight, said amounts being based on the total weight of the monomer content, and (5) a polymerization catalyst.

2. A thermoplastic freeze-thaw and mechanically stable triploymer emulsion composition having a pH between 9 and 11 comprising the reaction product of (1) from about 2% to about 7% based on the total weight of the monomer content of an alkali metal salt of a sulfated fatty acid emulsifier wherein said acid contains from 10 to 16 carbon atoms, containing as sole monomers (2) an α-unsaturated polymerizable monocarboxylic acid monomer having the general formula:

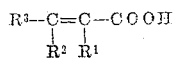

wherein $R^1$ and $R^2$ are substituents selected from the group consisting of hydrogen, alkyl radicals of 1 and 2 carbon atoms, halogen, and amino groups and $R^3$ is selected from the group consisting of hydrogen, alkyl radicals having 1 and 2 carbon atoms, halogen, an amino group, hydroxy and amino alkyl of 1 and 2 carbon atoms, and the total number of halogen, hydroxy and amino substituents is no greater than 1, in amounts of from about 1.0% to about 5% by weight based on the total weight of the monomer content, (3) a monomer selected from the group consisting of acrylonitrile and methacrylonitrile in amounts of from about 5% to about 55% by weight, (4) an ester selected from the group consisting of alkyl acrylates and alkyl methacrylates wherein the alkyl radical has from 1 to 4 carbon atoms, in amounts of from about 35% to about 94% by weight, said amounts being based on the total weight of the monomer content and (5) a polymerization catalyst.

3. A thermoplastic freeze-thaw and mechanically stable tripolymer emulsion composition having a pH greater than 7 comprising the reaction product of (1) from about 1% to 10% based on the total weight of the monomer content of sodium lauryl sulfate emulsifier, containing as sole monomers (2) an α-unsaturated polymerizable monocarboxylic acid monomer having the general formula:

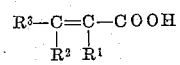

wherein $R^1$ and $R^2$ are substituents selected from the group consisting of hydrogen, alkyl radicals of 1 and 2 carbon atoms, halogen, and amino groups and $R^3$ is selected from the group consisting of hydrogen, alkyl radicals having 1 and 2 carbon atoms, halogen, an amino group, hydroxy, and amino alkyl of 1 and 2 carbon atoms, and the total number of halogen, hydroxy and amino substituents is no greater than 1, in amounts of from about 0.5% to 10% by weight based on the total weight of the monomer content, (3) a monomer selected from the group consisting of acrylonitrile and methacrylonitrile in amounts of from about 5% to 55% by weight, (4) an ester selected from the group consisting of alkyl acrylates and alkyl methacrylates wherein the alkyl group has from 1 to 4 carbon atoms, in amounts of from about 35% to about 94.5% by weight, said amounts being based on the total weight of the monomer content, and (5) a polymerization catalyst.

4. A thermoplastic freeze-thaw and mechanically stable tripolymer emulsion composition having a pH between 9 and 11 comprising the reaction product of (1) from about 2% to about 7% based on the total weight of the monomer content of sodium lauryl sulfate emulsifier, containing as sole monomers (2) an α-unsaturated polymerizable monocarboxylic acid monomer having the general formula:

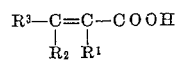

wherein $R^1$ and $R^2$ are substituents selected from the group consisting of hydrogen, alkyl radicals of 1 and 2 carbon atoms, halogen, and amino groups and $R^3$ is selected from the group consisting of hydrogen, alkyl radicals having 1 and 2 carbon atoms, halogen, an amino group, hydroxy and amino alkyl of 1 and 2 carbon atoms, and the total number of halogen, hydroxy and amino substituents is no greater than 1, in amounts of from about 1.0% to about 5% by weight based on the total weight of the monomer content, (3) a monomer selected from the group consisting of acrylonitrile and methacrylonitrile in amounts of from about 5% to 55% by weight, (4) an ester selected from the group consisting of alkyl acrylates and alkyl methacrylates wherein the alkyl group has from 1 to 4 carbon atoms, in amounts of from about 35% to about 94% by weight, said amounts being based on the total weight of the monomer content, and (5) a polymerization catalyst.

5. A thermoplastic freeze-thaw and mechanically stable tripolymer emulsion composition having a pH between 9 and 11 comprising the reaction product of (1) from about 1% to 10% based on the total weight of the monomer content of sodium lauryl sulfate emulsifier, containing as sole monomers (2) methacrylic acid in amounts of from about 0.5% to 10% by weight based on the total weight of the monomer content, (3) a monomer selected from the group consisting of acrylonitrile and methacrylonitrile in amounts of from about 5% to 55% by weight, (4) an ester selected from the group consisting of alkyl acrylates and alkyl methacrylates wherein the alkyl group has from 1 to 4 carbon atoms, in amounts of from about 35% to about 94.5% by weight, said amounts being based on the total weight of the monomer content and (5) a polymerization catalyst.

6. A thermoplastic freeze-thaw and mechanically stable tripolymer emulsion composition having a pH between 9 and 11 comprising the reaction product of (1) from about 1% to 10% based on the total weight of the monomer content of sodium lauryl sulfate emulsifier, containing as sole monomers (2) methacrylic acid in amounts of from about 1.0% to about 5% by weight based on the total weight of the monomer content, (3) acrylonitrile in amounts of from about 5% to 55% by weight, (4) an alkyl acrylate ester selected from the group wherein the alkyl group has from 1 to 4 carbon atoms, in amounts or from about 35% to about 94% by weight, said amounts being based on the total weight of the monomer content and (5) a polymerization catalyst.

7. A thermoplastic freeze-thaw and mechanically stable tripolymer emulsion composition having a pH between 9 and 11 comprising the reaction product of (1) from about 1% to 10% based on the total weight of the monomer content of sodium lauryl sulfate emulsifier, containing as sole monomers (2) methacrylic acid in amounts of from about 1.0% to about 5% by weight based on the total weight of the monomer content, (3) acrylonitrile in amounts of from about 5% to 55% by weight, (4) ethyl acrylate in amounts of from about 35% to about 94% by weight, said amounts being based on the total weight of the monomer content, and (5) a polymerization catalyst.

8. A thermoplastic freeze-thaw and mechanically stable polymerizable emulsion composition having a pH of about 9.5, containing as sole monomers about 70 parts by weight of ethyl acrylate, about 29 parts by weight of acrylonitrile and about 1 part by weight of methacrylic acid; from about 5 parts, based on the total weight of the monomers, of sodium lauryl sulfate as emulsifier; and about 1 part based on the total weight of the monomers, of sodium bicarbonate.

9. A thermoplastic freeze-thaw and mechanically stable tripolymer emulsion composition having a pH of about 9.5, said tripolymer having been prepared from the polymerization of about 70 parts by weight of ethyl acrylate, about 29 parts by weight of acrylonitrile, and about 1 part by weight of methacrylic acid, as the sole polymerizable monomers; from about 5 parts, based on the total weight of the monomers, of sodium lauryl sulfate as emulsifier, about 1 part, based on the total weight of the monomers, of sodium bicarbonate; and a polymerization catalyst.

References Cited in the file of this patent

UNITED STATES PATENTS

| | | |
|---|---|---|
| 2,579,008 | Naps et al. | Dec. 18, 1951 |
| 2,767,153 | Sutton | Oct. 16, 1956 |
| 2,768,080 | Hellmann et al. | Oct. 23, 1956 |

OTHER REFERENCES

Serial No. 397,138, Fikentscher et al (A. P. C.), published May 11, 1943.

UNITED STATES PATENT OFFICE
Certificate of Correction

Patent No. 2,868,752 January 13, 1959

Charles Frazier et al.

It is hereby certified that error appears in the printed specification of the above numbered patent requiring correction and that the said Letters Patent should read as corrected below.

Column 1, line 21, for "emulsifiers" read —emulsifier—; column 2, line 24, for "bnown" read —known—; column 4, line 16, for ' "air" ' read —"fair"—; column 6, line 40, for "it limited" read —is limited—; column 7, line 42, for "triploymer" read —tripolymer—; column 9, line 5, for "amounts or" read —amounts of—; column 10, line 12, for "polymers" read —monomers—.

Signed and sealed this 28th day of April 1959.

[SEAL]

Attest:
T. B. MORROW,
*Attesting Officer.*

ROBERT C. WATSON,
*Commissioner of Patents.*